United States Patent
Fukuda

(10) Patent No.: US 9,680,233 B2
(45) Date of Patent: Jun. 13, 2017

(54) MULTI-ANTENNA ARRAY SYSTEM

(71) Applicant: NTT DOCOMO, INC., Chiyoda-ku (JP)

(72) Inventor: Atsushi Fukuda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/911,968

(22) PCT Filed: Aug. 12, 2014

(86) PCT No.: PCT/JP2014/071263
§ 371 (c)(1),
(2) Date: Feb. 12, 2016

(87) PCT Pub. No.: WO2015/025775
PCT Pub. Date: Feb. 26, 2015

(65) Prior Publication Data
US 2016/0197412 A1    Jul. 7, 2016

(30) Foreign Application Priority Data

Aug. 23, 2013  (JP) .................................. 2013-173155

(51) Int. Cl.
*H01Q 23/00*      (2006.01)
*H01P 1/203*      (2006.01)
(Continued)

(52) U.S. Cl.
CPC ........... *H01Q 23/00* (2013.01); *H01P 1/2039* (2013.01); *H01Q 1/523* (2013.01); *H01Q 21/00* (2013.01)

(58) Field of Classification Search
CPC ................................. H01Q 23/00; H01Q 1/52
See application file for complete search history.

(56) References Cited

U.S. PATENT DOCUMENTS

| 5,867,060 A | 2/1999 | Burkett, Jr. et al. |
| 6,288,673 B1 | 9/2001 | Dolmeta et al. |

(Continued)

FOREIGN PATENT DOCUMENTS

| JP | 02-122701 A | 5/1990 |
| JP | 03-236610 A | 10/1991 |

(Continued)

OTHER PUBLICATIONS

International Search Report Issued Oct. 14, 2014, in PCT/JP2014/071263 Filed Aug. 12, 2014.

(Continued)

*Primary Examiner* — Dameon E Levi
*Assistant Examiner* — Andrea Lindgren Baltzell
(74) *Attorney, Agent, or Firm* — Oblon, McClelland, Maier & Neustadt, L.L.P.

(57) ABSTRACT

A multi-antenna array system includes active antennas each of which includes an antenna element and an amplifier that includes a matching circuit, a failure detector, and a circuit controller. The failure detector detects a failure in each of the active antennas, and in a case where a failure is detected in any of the active antennas, the circuit controller performs control to change a matching condition of the matching circuit included in each of the active antennas not having a failure such that total output power of the multi-antenna array system is maintained.

4 Claims, 4 Drawing Sheets

(51) Int. Cl.
*H01Q 21/00* (2006.01)
*H01Q 1/52* (2006.01)

(56) References Cited

U.S. PATENT DOCUMENTS

| | | | |
|---|---|---|---|
| 2005/0130595 A1* | 6/2005 | Shurvinton | H03G 3/3047 455/67.11 |
| 2007/0018758 A1 | 1/2007 | Fukuda et al. | |
| 2007/0026899 A1 | 2/2007 | Porco et al. | |
| 2008/0278260 A1 | 11/2008 | Fukuda et al. | |
| 2010/0194491 A1 | 8/2010 | Fukuda et al. | |

FOREIGN PATENT DOCUMENTS

| | | |
|---|---|---|
| JP | 11-312987 A | 11/1999 |
| JP | 2004-015179 A | 1/2004 |
| JP | 2005-260339 A | 9/2005 |
| JP | 2012-109752 A | 6/2012 |

OTHER PUBLICATIONS

Japanese First Office Action Issued Nov. 4, 2015 in JP 2013-173155 Filed Aug. 23, 2013 (with English translation).

Fukuda, et al., "Multi-band Power Amplifier Employing MEMS Switches for Optimum Matching," IEICE General Conference, Mar. 8, 2004 (with partial translation), 5 pages.

Comm Scope, Inc., "Active Antenna Systems," 2011, 18 pages.

Fukuda, et al., "Novel Band-Reconfigurable High Efficiency Power Amplifier Employing RF-MEMS Switches," IEICE Trans. Electron., vol. E88-C, No. 11, Nov. 2005, 9 pages.

Fukuda, et al., "Highly Efficient Multi-band Power Amplifier Employing Reconfigurable Matching and Biasing Networks," IEICE Trans. Electron., vol. E93-C, No. 7, Jul. 2010, 9 pages.

Furuta, et al., "Compact 1.5 GHZ to 2.5 GHz multi-Band multi-mode power amplifier," IEICE Electronics Express, vol. 8, No. 11, 2011, 5 pages.

Fukuda, et al., "Novel 900 MHz/1.9 GHz Dual-Mode Power Amplifier Employing MEMS Switches for Optimum Matching," IEICE Microwave and Wireless Components Letters, vol. 14, No. 3, Mar. 2004, 3 pages.

Fukuda, et al., "Low-Loss Matching Network Design for Band-Switchable Multi-Band Power Amplifier," IEICE Trans. Electron. vol. E95-C, No. 7, Jul. 2012, 10 pages.

Extended Search Report Issued on Mar. 14, 2017 for corresponding European Application No. 14838660.9 (7 pages).

* cited by examiner

MULTI-ANTENNA ARRAY SYSTEM

TECHNICAL FIELD

The present invention relates to a multi-antenna array system including a plurality of active antennas, in which output characteristics of an amplifier included in each of the active antennas can be changed corresponding to whether any of the active antennas has a failure.

BACKGROUND ART

In a case where, in a multi-antenna array system including a plurality of active antennas, any of the active antennas has a failure, there is a technique with which the directionality of the multi-antenna array system distorted by the influence of the failure can be corrected.

PRIOR ART LITERATURE

Non-Patent Literature

Non-patent literature 1: COMMSCOPE, "Active Antenna Systems", 2011. (Internet <URL: http://docs.commscope.com/Public/active_antenna_presentation.pdf> [Search in Aug. 23, 2013])

SUMMARY OF THE INVENTION

Problems to be Solved by the Invention

However, no techniques are known that consider the total output power of the multi-antenna array system is lowered due to a failure having occurred in any of the active antennas.

The object of the present invention is to provide a multi-antenna array system including a plurality of active antennas, in which output characteristics of an amplifier included in each of the active antennas can be changed corresponding to whether any of the active antennas has a failure.

Means to Solve the Problems

A multi-antenna array system according to the present invention includes active antennas each of which includes an antenna element and an amplifier that includes a matching circuit, a failure detector, and a circuit controller. The failure detector detects a failure in each of the active antennas, and in a case where a failure is detected in any of the active antennas, the circuit controller performs control to change a matching condition of the matching circuit included in each of the active antennas not having a failure such that total output power of the multi-antenna array system is maintained.

Change of the matching condition is performed by changing a circuit constant of the matching circuit, for example.

For example, when there is no active antenna having a failure, in each of the active antennas, the matching condition of the matching circuit included in the amplifier is set to a first condition defined with a standard for maximizing a power utilization efficiency of the amplifier. When there is an active antenna having a failure, the matching condition of the matching circuit included in each of the active antennas not having a failure is set to a second condition defined with a standard for maximizing an output power of the amplifier. When a failure in any of the active antennas is detected, the circuit controller performs control to change the matching condition of the matching circuit included in each of the active antennas not having a failure from the first condition to the second condition.

The second condition may be decided corresponding to the number of the active antennas having a failure.

Effects of the Invention

In the present invention, when a failure in an active antenna is detected, a matching condition of a matching circuit included in each of the active antennas not having a failure is changed, whereby output characteristics of an amplifier included in each of the active antennas can be changed corresponding to whether any of the active antennas has a failure.

DETAILED DESCRIPTION OF THE EMBODIMENT

Figure 1:
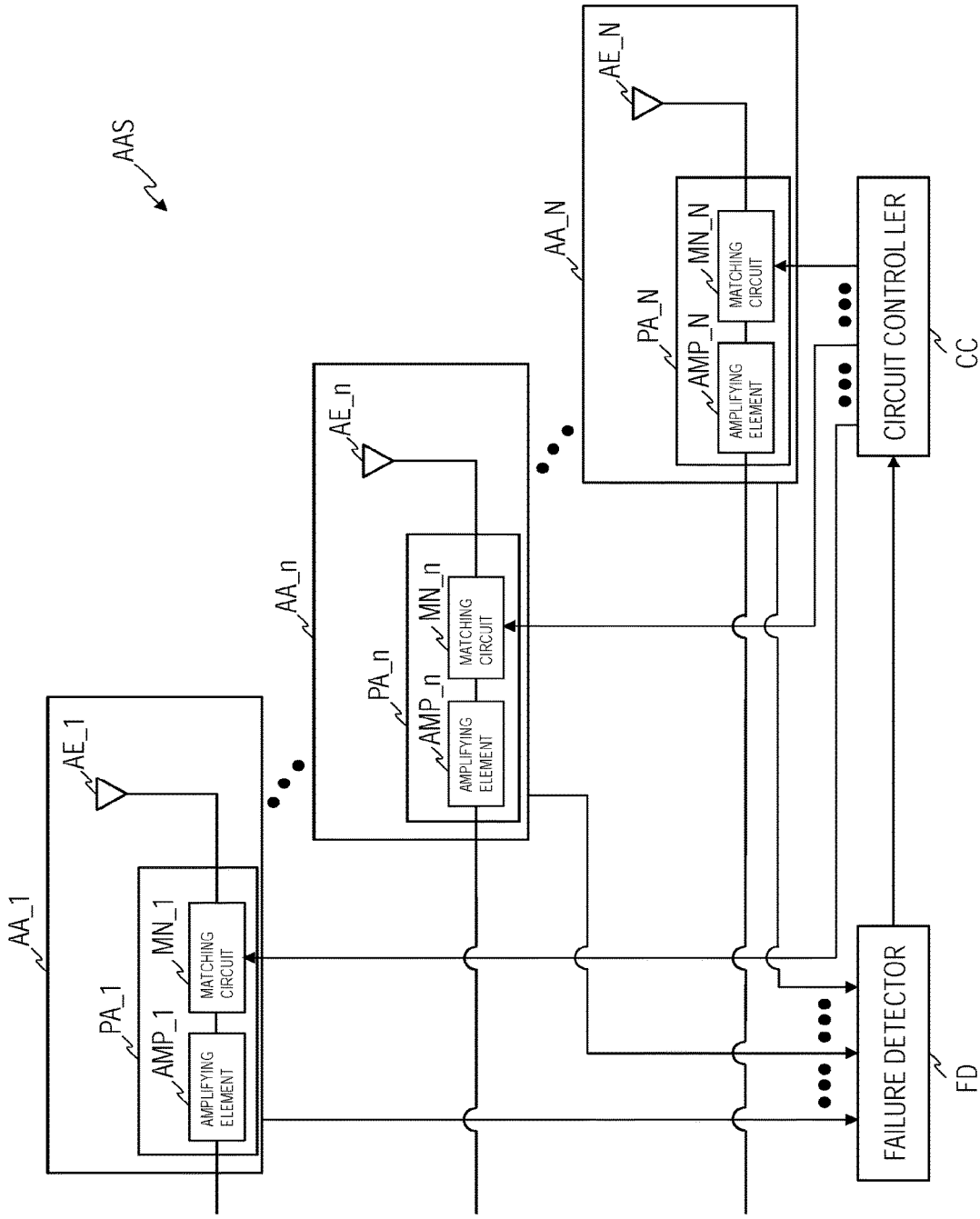
FIG. 1 is a diagram illustrating a configuration example of a multi-antenna array system according to an embodiment.

A multi-antenna array system including N active antennas in each of which an antenna element and an active circuit such as a power amplifier (hereinafter, simply referred to as amplifier) are integrated is known. One active antenna corresponds to one transmission line, and the multi-antenna array system is formed of N transmission lines. N is a predetermined integer of 2 or more. One of the use methods of a multi-antenna array system is a beam forming technique in which a radio wave is radiated only in a specific direction by adjusting amplitude and phase of a transmission signal from each of the active antennas. In the beam forming technique, in-phase synthesis condition is satisfied in the radiation direction, and the output power is the total sum of the output power from each of the active antennas (hereinafter, referred to as total output power).

When N active antennas are used as in a multi-antenna array system, the failure rate of the multi-antenna array system coming from failures in the active antennas is N-fold of the failure rate of a single active antenna at the maximum. Furthermore, the total output power is (N−m)/N-fold when m active antennas (1≤m<N) each have a failure, so that the service coverage of a cellular system using a multi-antenna array system as described above becomes narrow.

To solve this problem, a requirement specification for the output power of each of the active antennas may be determined in advance so that the total output power for covering a required service coverage can be secured even when one or more active antennas each have a failure. For example, in a case where m active antennas each have a failure, it is necessary to set the output power of each of the active antennas not having a failure to N/(N−m)-fold of the output power in a case where none of the active antennas has a failure.

To implement this measure, a multi-antenna array system may be formed, in which output characteristics of an amplifier included in each of the active antennas can be changed corresponding to whether one or more of the active antennas each have a failure. A multi-antenna array system AAS according to an embodiment includes N active antennas AA_1, ..., AA_N (each active antenna AA_n (n=1, 2, ..., N) includes an antenna element AE_n and an amplifier PA_n that includes an amplifying element AMP_n and a matching circuit MN_n), a failure detector FD, and a circuit controller CC. The failure detector FD performs failure detection of each active antenna AA_n (n=1, ... N). When a failure in an active antenna is detected, the circuit controller CC performs control to change output characteristics of the amplifier included in each of the active antennas not having a failure. Output characteristics (such as the output power and the power utilization efficiency) of the amplifier PA_n are determined by impedance (hereinafter, referred to as operational impedance) of the matching circuit MN_n as viewed from the amplifying element AMP_n. Change of the output characteristics of the amplifier PA_n thus can be performed by changing a matching condition of the matching circuit MN_n included in the amplifier PA_n. Change of a matching condition is performed by changing a circuit constant of the matching circuit MN_n, for example. The term "matching" herein is used to mean matching a target impedance (impedance of the amplifying element as viewed from the matching circuit, for example) with a desired impedance (impedance required corresponding to the matching condition when viewing toward the side of the amplifying element from an antenna element, for example). (In this sense, the "matching" may be referred to as impedance conversion.)

This will be described in detail with reference to FIG. 1. An n-th active antenna AA_n has a configuration in which an n-th amplifier PA_n and an n-th antenna element AE_n are included. The n-th amplifier PA_n has a configuration in which an n-th amplifying element AMP_n and an n-th matching circuit MN_n are included (n=1, 2, ..., N).

The failure detector FD performs failure detection of each active antenna AA_1, AA_2, ..., AA_N (this failure detection may be performed with a conventional technique). When in active antennas AA_$K_1$, AA_$K_2$, ..., AA_$K_m$ ($K_i \in \{1, 2, ..., N\}$, i=$\{1, 2, ..., m\}$) each have a failure, the circuit controller CC outputs, on the basis of failure information from the failure detector FD, a control signal for changing the circuit constants of the matching circuits MN_$K_j$(j=$\{1, 2, ..., N-m\}$) included in the active antennas AA_$K_j$ ($K_j \in \{1, 2, ..., N\}-\{K_1, K_2, ..., K_m\}$, j=$\{1, 2, ..., N-m\}$) each not having a failure. The amplifiers PA_$K_j$ (j=$\{1, 2, ..., N-m\}$), which are included in the active antennas AA_$K_j$ (j=$\{1, 2, ..., N-m\}$) each not having a failure, respectively changes the circuit constants of the corresponding matching circuits MN_$K_j$ (j=$\{1, 2, ..., N-m\}$) in accordance with the control signal received from the circuit controller CC. When none of the active antennas AA_1, AA_2, ..., AA_N has a failure, no control is performed by the circuit controller CC. When a failure is found in any of the active antennas, processing for stopping the use of the active antenna having a failure is performed by a circuit unit, which is not illustrated.

Considering that the total output power P the multi-antenna array system AAS is generally predetermined as a design requirement, when none of the active antennas AA_1, AA_2, ..., AA_N has a failure, $P_{total}/N$ is required as the output power $P_{out\_normal}$ of each of the active antennas ($P_{out\_normal}=P_{total}/N$)

By contrast, when in active antennas each have a failure and cannot perform output operations, for the total output power $P_{total}$ of the multi-antenna array system AAS to be maintained, $P_{total}/(N-m)$ is required as the output power $P_{out\_fault}$ of each of the active antennas not having a failure ($P_{out\_fault}=P_{total}/(N-m)$).

Accordingly, a relation of $P_{out\_normal}=P_{out\_fault} \times (N-m)/N$ is established between $P_{out\_normal}$ and $P_{out\_fault}$ when m active antennas each have a failure.

Therefore, when the assumed maximum number of the active antennas each having a failure, that is, the maximum value for in is M, $P_{total}/(N-m)$ is required as the maximum output $P_{out\_max}$ of each of the active antennas ($P_{out\_max}=P_{total}/(N-M)$). From this, when none of the active antennas AA_1, AA_2, ..., AA_N has a failure, the output power $P_{out\_normal}$ of each of the active antennas AA_1, AA_2, ..., AA_N may be set to (N-M)/N-fold of $P_{out\_max}$ for operation ($P_{out\_normal}=P_{out\_max} \times (N-M)/N$). More specifically, when none of the active antennas AA_1, AA_2, ..., AA_N has a failure, each of the active antennas is operated at a back-off point of $\log_{10}(N)-\log_{10}(N-M)$ [dB]. In this case, the output decrease amount from the saturation power is defined as the back-off (see FIG. 2).

Accordingly, when the failure detector FD detects a failure in in active antennas, the circuit constants of the matching circuits MN_$K_j$(j=$\{1, 2, ..., N-m\}$) are changed by the control described above such that the output power $P_{out\_fault}$ of each of the active antennas AA_$K_j$ (j=$\{1, 2, ..., N-m\}$) not having a failure is $P_{out\_fault}=P_{out\_normal} \times N/(N-m)$.

Figure 2:
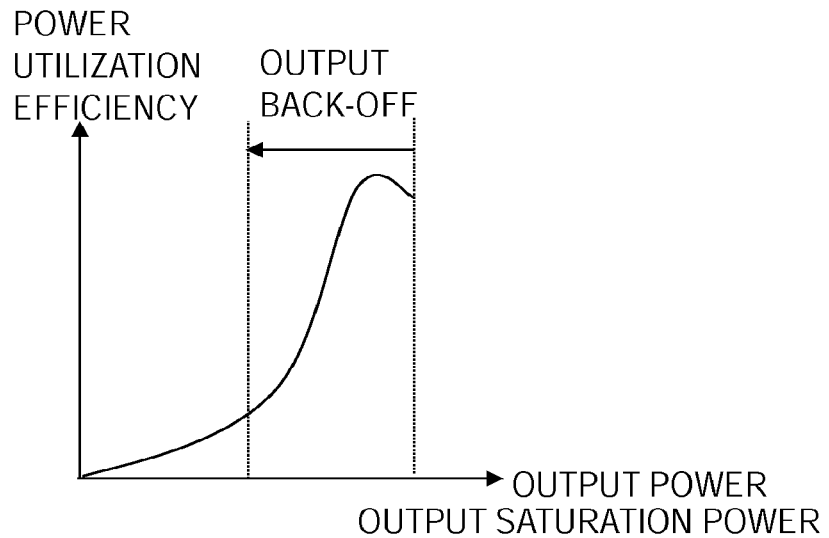
FIG. 2 is a diagram illustrating the relation between an output power and a power utilization efficiency of an amplifier.

The relation between the output power and the power utilization efficiency of the amplifier is as illustrated in FIG. 2. The power utilization efficiency of the amplifier is the highest near the output saturation power of this amplifier and decreases in accordance with decrease of the output power (that is, increase of the back-off amount). Operating each of the active antennas under a situation where the back-off is high as described above thus means that the power utilization efficiency of the amplifier is very low. Decrease of the power utilization efficiency of the amplifier leads to increase of power consumption, whereby the energy efficiency of the multi-antenna array system becomes low when none of the active antennas has a failure.

It is noted here that the power utilization efficiency is determined depending on the operational impedance as described above. Generally, the operational impedance for the maximum output power and that for the maximum power utilization efficiency are different (more specifically, the output power and the power utilization efficiency of the amplifier vary depending on the matching condition at the matching circuit). For this reason, the operational impedance in a case where none of the active antennas has a failure may be set such that the maximum power utilization efficiency can be obtained.

Figure 3:
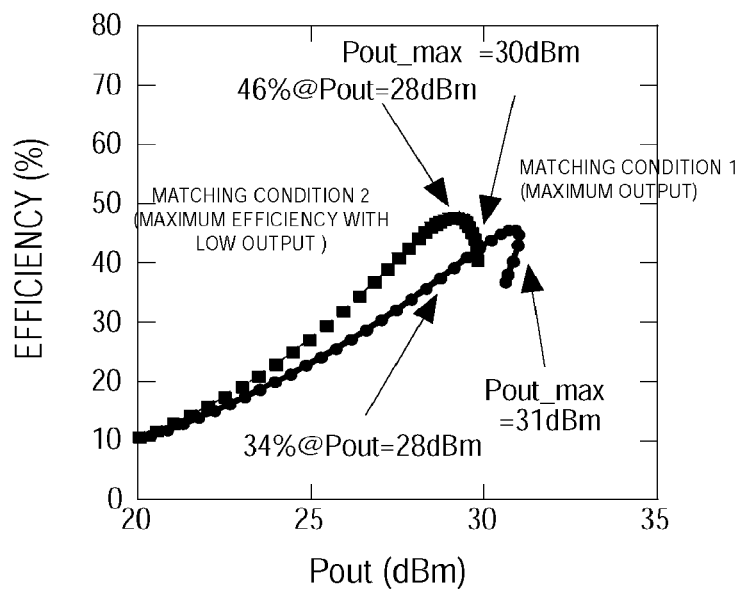
FIG. 3 is a diagram illustrating the relation between an output power and a power utilization efficiency under different matching conditions.

FIG. 3 illustrates the relation between the output power and the power utilization efficiency under a matching condition (matching condition 1) under which the output power is maximized and the relation between the output power and the power utilization efficiency under a matching condition (matching condition 2) under which the power utilization efficiency at a low output time is maximized. As can be seen from this example, although the maximum output power (30 dBm) under the matching condition 2 is lower than the maximum output power (31 dBm) under the matching condition 1, the power utilization efficiency at the time with a back-off of 3 dB (this is based on the assumption that N/2 active antennas each have a failure) is 46% under the matching condition 2, which is higher than 34% under the matching condition 1.

Accordingly, when none of the active antennas has a failure, each of the active antennas may be operated under the matching condition 2, whereby high power utilization efficiency is achieved in each of the active antennas. Under a situation where a failure is occurred in each of N/2 active antennas, each of the active antennas may be operated under the matching condition 1, whereby the operation is performed with the output power increased for each of the active antennas not having a failure. The matching condition 1 is defined corresponding to each of the following cases: (1) when a failure is occurred in one active antenna, (2) when a failure is occurred in each of two active antennas, . . . , (M) when a failure is occurred in each of M active antennas.

Under a situation where a failure is occurred in any of the active antennas, the operation is performed under the matching condition under which the output power is maximized. As far as that operation is concerned, it can be said that high power utilization efficiency is being achieved.

To summarize the matters described above, when there is no to active antenna having a failure, as the matching condition of the matching circuit included in each amplifier, the first condition defined with the standard for maximizing the power utilization efficiency of the amplifier is used. When any of the active antennas has a failure, as the matching condition of the matching circuit included in each of the active antennas not having a failure, the second condition defined with the standard for maximizing the output power of the amplifier is used. When a failure in any of the active antenna is detected, the circuit controller may perform control to change the matching condition of the matching circuit included in each of the active antennas not having a failure from the first condition to the second condition.

More specifically, the "standard for maximizing the power utilization efficiency of the amplifier" under the first condition indicates that the power utilization efficiency is maximized with the output power at the back-off point of $\log_{10}(N)-\log_{10}(N-M)$ [dB]. The "standard for maximizing the output power of the amplifier" under the second condition indicates that the output power $P_{out\_fault}$ of each of the active antennas $AA\_K_j$ ($j=\{1, 2, \ldots, N-m\}$) not having a failure satisfies $P_{out\_fault}=P_{out\_normal} \times N/(N-m)$ in accordance with the number in of the active antennas each having a failure. The output power of the amplifiers $PA\_K_j$ ($j=\{1, 2, \ldots, N-m\}$) can be regarded as the output power of the active antennas $AA\_K_j$ ($j=\{1, 2, \ldots, N-m\}$).

As a technique to change the operational impedance of the matching circuit, a variable matching circuit described in the reference literature described below can be used, for example. In the variable matching circuit disclosed in the reference literature described below, ON/OFF of a switch provided in the circuit is switched to change the circuit constant, whereby change of the operational impedance is achieved.

(Reference Literature) Atsushi Fukuda et al., "Multi-band Power Amplifier Employing MEMS Switches", IEICE General Conference, 2004, C-2-4, p. 39

Figure 4:
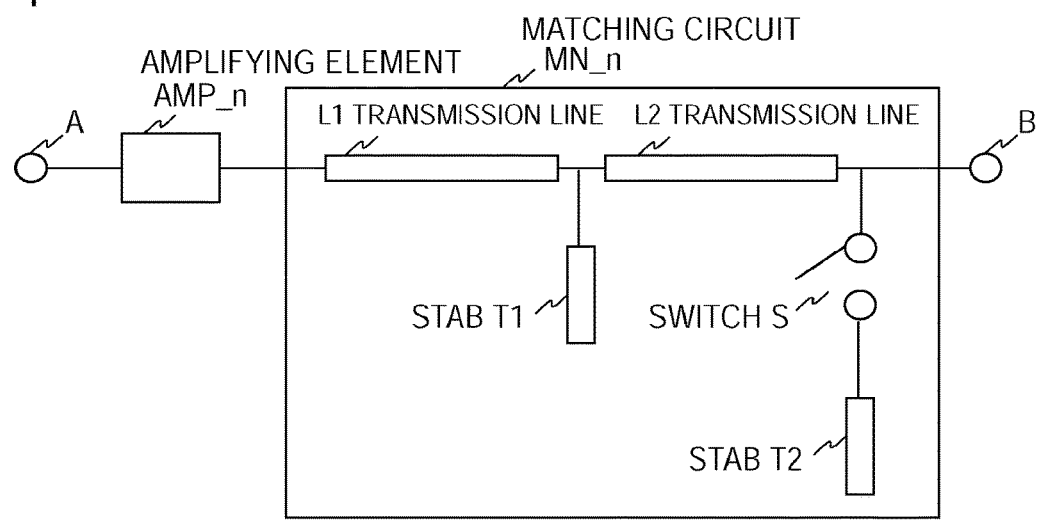
FIG. 4 is an example of a matching circuit (No. 1).

As the configuration of this variable matching circuit, a circuit illustrated in FIG. 4 can be used, for example. This example represents the configuration of the variable matching circuit corresponding to switching of two types of operations in which none of the active antennas has a failure and a previously assumed number of active antennas each have a failure. There is one type of the "previously assumed number" in this case. Accordingly, when the previously assumed number is g and when the number smaller than g of active antennas each have a failure or when the number greater than g of active antennas each have a failure, the operation of the multi-antenna array system is stopped. For example, when g=1, although switching of the matching conditions is performed when one active antenna has a failure, the operation of the multi-antenna array system is stopped when two or more active antennas each have a failure. In this example, it is assumed that each of the matching circuits MN_n (n=1, 2, . . . , N) has the same configuration. However, a case where each of the matching circuits MN_n (n=1, 2, . . . , N) has a different configuration from one another and a case where some of the matching circuits MN_n (n=1, 2, . . . , N) have the same configuration are acceptable.

Figure 5:
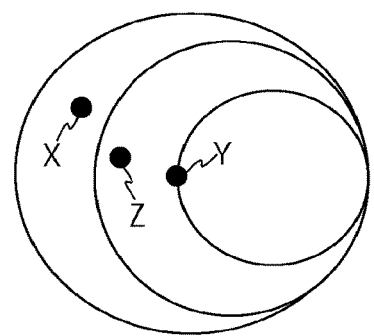
FIG. 5 is a Smith chart.

The circuit illustrated in FIG. 4 includes transmission lines L1, L2 the characteristic impedance of each of which is Z0, shunt stabs T1, T2, and a switch S. In this configuration, the line lengths of the transmission lines L1, L2 and the susceptances of the shunt stabs T1, T2 may be designed so as to satisfy the conditions described below, for example. FIG. 5 is a Smith chart illustrating impedance when viewing toward the side of the amplifying element from a port B connected to the antenna element (hereinafter, referred to as "impedance of port B"). It is assumed that the switch S satisfies the ideal conditions.

(a) When the switch S is ON, with the contributing parts of the circuit (transmission lines L1, L2 and stabs T1, T2), the impedance of the port B is substantially in the center, Y of the Smith chart in FIG. 5, that is, Z0 (corresponds to the second condition).

(b) When the switch S is OFF, with the contributing parts of the circuit (transmission lines L1, L2 and stab T1), the impedance of the port B is X of the Smith chart in FIG. 5 (corresponds to the first condition).

As described above, the matching condition can be changed by changing the state (ON/OFF) of the switch. More specifically, the matching condition can be changed by transmitting a signal for controlling ON/OFF of the switch of the matching circuit from the circuit controller CC illustrated in FIG. 1 to each of the matching circuits included in the active antennas each not having a failure.

As described above, the circuit illustrated in FIG. 4 is an example in a case where there is one type of the "previously assumed number g". For example, when there are two types of the above-described "previously assumed number" (for example, g1, g2, and g1<g2; specific example: g1=1, g2=2), a circuit can be employed in which the number of shunt circuit units included in the circuit FIG. 4 is increased, as in the configuration illustrated in FIG. 6. The circuit in FIG. 6 has two switches and thus can adapt to three types of failure patterns at the maximum, which is the number obtained by subtracting one from the number of combinations of ON and OFF of each switch. One is subtracted because a case where none of the active antennas has a failure is considered.

Figure 6:
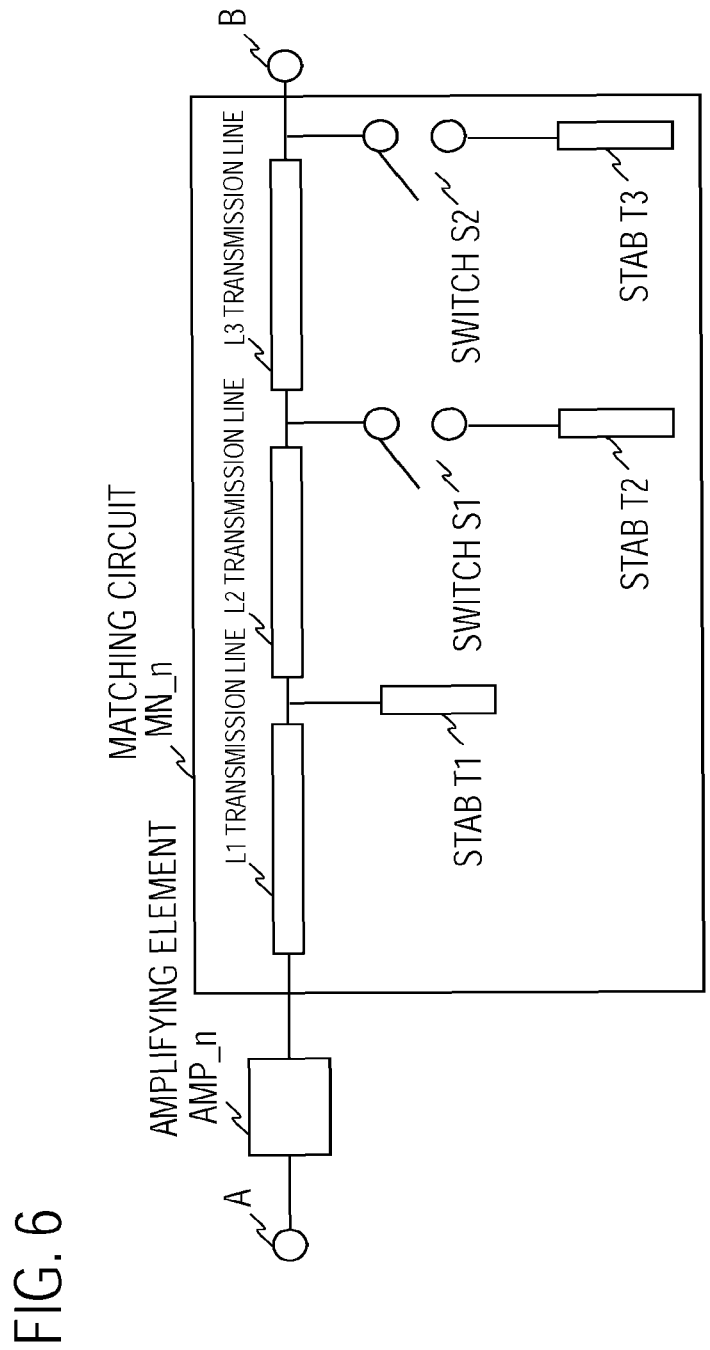
FIG. 6 is an example of the matching circuit (No. 2).

The circuit in FIG. 6 includes transmission lines L1, L2, L3 the characteristic impedance of each of which is Z0, shunt stabs T1, T2, T3, and switches S1, S2. In this configuration, the line lengths of the transmission lines L1, L2, L3 and the susceptances of the shunt stabs T1, T2, T3 may be designed so as to satisfy the conditions described below, for example. It is assumed that the switches S1, S2 satisfy the ideal conditions.

(a) When both of the switches S1, S2 are ON, with the contributing parts of the circuit (transmission lines L1, L2, L3 and stabs T1, T2, T3), the impedance of the port B is substantially in the center, Y of the Smith chart in FIG. 5, that is, Z0 (corresponds to the second condition in a case where the number of the active antennas each having a failure is g2).

(b) When the switch S1 is ON and the switch S2 is OFF, with the contributing parts of the circuit (transmission lines L1, L2, L3 and stabs T1, T2), the impedance of the port B is Z of the Smith chart in FIG. 5 (corresponds to the second condition in a case where the number of the active antennas each having a failure is g1).

(c) When both of the switches S1, S2 are OFF, with the contributing parts of the circuit (transmission lines L1, L2, L3 and stab T1), the impedance of the port B is X of the Smith chart in FIG. 5 (corresponds to the first condition).

Besides these methods, as the method to change the matching condition of the matching circuit, a method with which a bias voltage to be applied to the amplifying element is controlled can be used, and a variable device (for example, a variable capacitor) can be used to continuously change the matching conditions.

As described above, in the multi-antenna array system according to the embodiment, the power utilization efficiency of the multi-antenna array system when there is no active antenna having a failure can be increased and the output power of the multi-antenna array system under a situation where any of the active antennas has a failure can be stabilized. This can ensure a constant communication quality within the service coverage, and at the same time, the multi-antenna array system can be constantly operated with high power utilization efficiency.

What is claimed is:

1. A multi-antenna array system comprising:
    active antennas each of which includes an antenna element and an amplifier including a matching circuit;
    a failure detector configured to detect a failure in each of the active antennas; and
    a circuit controller configured to
        when there is no active antenna having a failure, in each of the active antennas, set a matching condition of the matching circuit included in the amplifier is to a first condition defined by a standard for maximizing a power utilization efficiency of the amplifier;
        when there is one or more active antennas having a failure, set a matching condition of the matching circuit included in each of the active antennas not having a failure to a second condition defined by a standard for maximizing an output power of the amplifier; and
        when a failure in any of the active antennas is detected, change the matching condition of the matching circuit included in each of the active antennas not having a failure from the first condition to the second condition.

2. The multi-antenna array system according to claim 1, wherein
    change of the matching condition is performed by changing a circuit constant of the matching circuit.

3. The multi-antenna array system according to claim 1, wherein
    the second condition is decided corresponding to a total number of the active antennas having a failure.

4. The multi-antenna array system according to claim 2, wherein
    the second condition is decided corresponding to a total number of the active antennas having a failure.

* * * * *